United States Patent
Garrison et al.

(10) Patent No.: US 10,779,635 B2
(45) Date of Patent: Sep. 22, 2020

(54) ENERGY GENERATION

(71) Applicant: The Government of the United States, as represented by the Secretary of the Army, Washington, DC (US)

(72) Inventors: Connor Garrison, Plano, TX (US); Julianne Douglas, Belcamp, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 887 days.

(21) Appl. No.: 15/275,543

(22) Filed: Sep. 26, 2016

(65) Prior Publication Data
US 2018/0091022 A1   Mar. 29, 2018

(51) Int. Cl.
| | |
|---|---|
| H02K 7/18 | (2006.01) |
| A45F 3/06 | (2006.01) |
| H02K 7/116 | (2006.01) |
| H02J 7/32 | (2006.01) |
| A45C 15/00 | (2006.01) |
| A45F 5/00 | (2006.01) |
| A45F 3/00 | (2006.01) |

(52) U.S. Cl.
CPC .............. *A45F 3/06* (2013.01); *A45C 15/00* (2013.01); *H02J 7/32* (2013.01); *H02K 7/116* (2013.01); *A45F 2003/003* (2013.01); *A45F 2005/002* (2013.01)

(58) Field of Classification Search
CPC .............. A45F 3/06; A45F 2003/003; A45F 2005/002; A45C 15/00; H02J 7/32; H02K 7/116; H02K 7/06; H02K 7/1853
See application file for complete search history.

(56) References Cited

U.S. PATENT DOCUMENTS

| | | | |
|---|---|---|---|
| 6,734,575 B2 | 5/2004 | Ricketts | |
| 7,232,238 B2 | 6/2007 | Long et al. | |
| 7,404,651 B2 | 7/2008 | Long et al. | |
| 7,638,889 B2 * | 12/2009 | Yeh ..................... | H02K 7/1853 290/1 A |
| 8,004,101 B2 | 8/2011 | Aaron | |
| 8,564,144 B1 | 10/2013 | Rome et al. | |
| 8,568,099 B2 | 10/2013 | Sabannavar et al. | |
| 8,597,505 B2 | 12/2013 | Fulkerson et al. | |
| 8,970,055 B2 | 3/2015 | Sharon et al. | |
| 8,975,765 B2 | 3/2015 | Burke | |
| 9,237,211 B2 | 1/2016 | Tabe | |

(Continued)

OTHER PUBLICATIONS

Kathryn Bailey, Army's energy harvesting innovations lighten Soldier's heavy load, Mar. 9, 2016, http://www.cerdec.army.mil/news_and_media/Armys_energy_harvesting_innovations_lighten_Soldiers_heavy_load/.

(Continued)

*Primary Examiner* — Bernard Rojas
(74) *Attorney, Agent, or Firm* — Ronald Krosky; Azza Jayaprakash (57) ABSTRACT

Various embodiments are described that relate to energy generation. A housing can retain a spring coupled to a gear set. As the spring experiences linear compression and extension, the spring can cause rotational movement in the gear set. The rotational movement from the gear set can cause rotation of a rotational magnet. The rotational magnet, when rotated about a coil set, can convert an energy. The energy can be used to charge a battery.

20 Claims, 9 Drawing Sheets

(56) References Cited

U.S. PATENT DOCUMENTS

| | | | |
|---|---|---|---|
| 2004/0222637 A1* | 11/2004 | Bednyak | B60L 8/00 290/1 R |
| 2006/0202483 A1 | 9/2006 | Gonzalez | |
| 2007/0096469 A1* | 5/2007 | Yeh | H02K 7/1853 290/1 R |
| 2009/0015022 A1* | 1/2009 | Rome | A45F 3/08 290/1 A |
| 2009/0134632 A1 | 5/2009 | Kvisteroy et al. | |
| 2010/0013241 A1* | 1/2010 | Yeh | B62J 1/06 290/1 C |
| 2011/0022025 A1 | 1/2011 | Savoie et al. | |
| 2011/0204653 A1 | 8/2011 | Liu et al. | |
| 2014/0145450 A1 | 5/2014 | Stanton et al. | |
| 2015/0188389 A1 | 7/2015 | Wan et al. | |
| 2016/0010818 A1 | 1/2016 | Johnson et al. | |
| 2016/0013737 A1 | 1/2016 | Yanez Villarreal | |
| 2016/0131102 A1 | 5/2016 | Patel | |
| 2016/0197262 A1 | 7/2016 | Zawada et al. | |

OTHER PUBLICATIONS

Ian Duncan, APG engineers developing cutting-edge power technology for soldiers, Baltimore Sun, Sep. 12, 2015, http://www.baltimoresun.com/news/maryland/bs-md-soldier-battery-research-20150911-story.html.

Solepower, FAQ, Accessed Sep. 26, 2016, http://www.solepowertech.com/support/.

Lighning Packs, LLC, Electricity-Generating Backpack, Accessed Sep. 26, 2016, http://www.lightningpacks.com/lightningpacks.com/Electricity-Generating_Backpack_|_Lightning_Packs,_LLC.html.

John Joyce, Navy-Marine Corps—Army Engineers Win Top Awards for Energy Harvesting Innovation, Mar. 10, 2016, http://www.navy.mil/submit/display.asp?story_id=93552.

Anthony Ripley, Powering the Marne, Enabling the Force, Tactical Defense Media, Accessed Sep. 26, 2016, http://tacticaldefensemedia.com/powering-the-marine-enabling-the-force/.

Allyson Versprille, Military Tests Energy Generating Backpack, National Defense Magazine, Aug. 2015, http://www.nationaldefensemagazine.org/archive/2015/August/Pages/MilitaryTestsEnergyGeneratingBackpack.aspx.

CNN, Backpack harnesses pedestrian power, Sep. 9, 2005, CNN, http://www.cnn.com/2005/TECH/09/09/backpack.power/.

Randolph E. Schmid, New backpack puts the juice in power walking, USA Today, Sep. 6, 2005, http://usatoday30.usatoday.com/tech/products/gear/2005-09-08-electric-backpack_x.htm?csp=34.

New York Times, An Energy-Emitting . . . Backpack?, New York Times, Oct. 11, 2006, http://www.nytimes.com/2005/10/11/science/an-energyemitting-backpack.html.

Steve Cross, Be Your Own Battery, Nov. 15, 2005, Popular Science, http://www.popsci.com/charging-batteries/article/2005-11/be-your-own-battery.

Sarah Graham, Pounding Pavement Generates Electricity When Wearing Novel Backpack, Scientific American, Sep. 9, 2005, http://www.scientificamerican.com/article/pounding-pavement-generat/.

John Roach, New Backpack Generates Its Own Electricity, Sep. 8, 2005, National Geographic, http://news.nationalgeographic.com/news/2005/09/0908_050908_backpack.html.

Paul Eng, Researchers Develop Power-Producing Backpack, Sep. 8, 2005, ABC News, http://abcnews.go.com/Technology/FutureTech/story?id=1104740&page=1.

Alex Raksin, Backpack Pumps Power From Pedestrians, Sep. 10, 2005, Los Angeles Times, http://articles.latimes.com/2005/sep/10/science/sci-backpack10.

Faye Flam, Power walking at Penn. This backpack generates one hip energy source Backpack lifts the power from body's motion, The Philadelphia Inquirer, Sep. 9, 2005, http://articles.philly.com/2005-09-09/news/25429708_1_backpack-cell-phone-devices.

Daniel B. Kane, Backpack generates its own electricity, Sep. 8, 2005, NBC News, http://www.nbcnews.com/id/9245155/#.V-Io4v6QL1K.

WebMD, Backpack Creates Electric Power as You Walk, Sep. 8, 2005, http://www.webmd.com/fitness-exercise/news/20050908/backpack-creates-electric-power-as-you-walk#1.

Philip Ball, Power packs harness hikers' energy, Sep. 8, 2005, International Weekly Journal of Science, http://www.nature.com/news/2005/050905/full/news050905-14.html.

Carolyn Gramling, New Backpack Powers Up, Sep. 8m, 2005, Science Magazine, http://www.sciencemag.org/news/2005/09/new-backpack-powers.

Peter Weiss, Getting a charge out of backpacking, Sep. 27, 2005, Science News, https://www.sciencenews.org/article/getting-charge-out-backpacking.

Emily Sohn, Electric Backpack, Sep. 30, 2005, Science News for Students, https://www.sciencenewsforstudents.org/article/electric-backpack.

Paul Marks, Backpack generates a powerful punch, Sep. 8, 2005, New Scientist, https://www.newscientist.com/article/dn7970-backpack-generates-a-powerful-punch/#.Uv_YMrvLgxB.

Greg Lester, Shoe Leather as a Renewable Resource: Penn Biologists Invent Power-Generating Backpack, Penn News, Sep. 8, 2005, https://news.upenn.edu/news/shoe-leather-renewable-resource-penn-biologists-invent-power-generating-backpack.

* cited by examiner

ENERGY GENERATION

GOVERNMENT INTEREST

The innovation described herein may be manufactured, used, imported, sold, and licensed by or for the Government of the United States of America without the payment of any royalty thereon or therefor.

BACKGROUND

Electronic devices have a wide variety of uses and applications in modern society. These electronic devices use electrical energy to function. In one example, this energy is derived from a battery. As the devices are used, the battery level lowers and ultimately reaches a level so low that the electronic device does not function without a new battery, which can be expensive, or the battery being recharged. Therefore, it can be valuable to recharge a battery.

SUMMARY

In one embodiment, a system can comprise a linear hardware component that can be configured to experience a linear movement sequence. The system also can comprise a conversion hardware component that can be configured to convert the linear movement sequence into a rotational movement sequence. The system additionally can comprise an energy generation hardware component that can be configured to generate an energy from the rotational movement sequence.

In another embodiment, a system, retained by a housing, comprises a capture hardware component and an energy generation hardware component. The capture hardware component can be configured to experience a movement sequence as a result of at least part of the housing being placed in tension. The energy generation hardware component can be configured to convert an energy from the movement sequence.

In yet another embodiment, a system, retained by a housing, can comprise a mass. The system can also comprise a capture hardware component, coupled to the mass, configured to experience a movement sequence due to movement of the mass resultant from movement of the housing. The system can further comprise an energy generation hardware component configured to generate an energy from the movement sequence.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

In one embodiment, energy conversion can occur from a housing. A person, as well as an item carried by the person, can experience movement. That movement can be captured and converted into electrical energy. As an example of this capturing, linear movement of a spring coupled to a backpack can be transferred into rotational movement. The rotational movement can cause a rotational magnet(s) to rotate. Rotation of the rotational magnet in conjunction with a coil assembly can be used to convert a kinetic energy (captured as a mechanical energy) into electrical energy.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 1A:
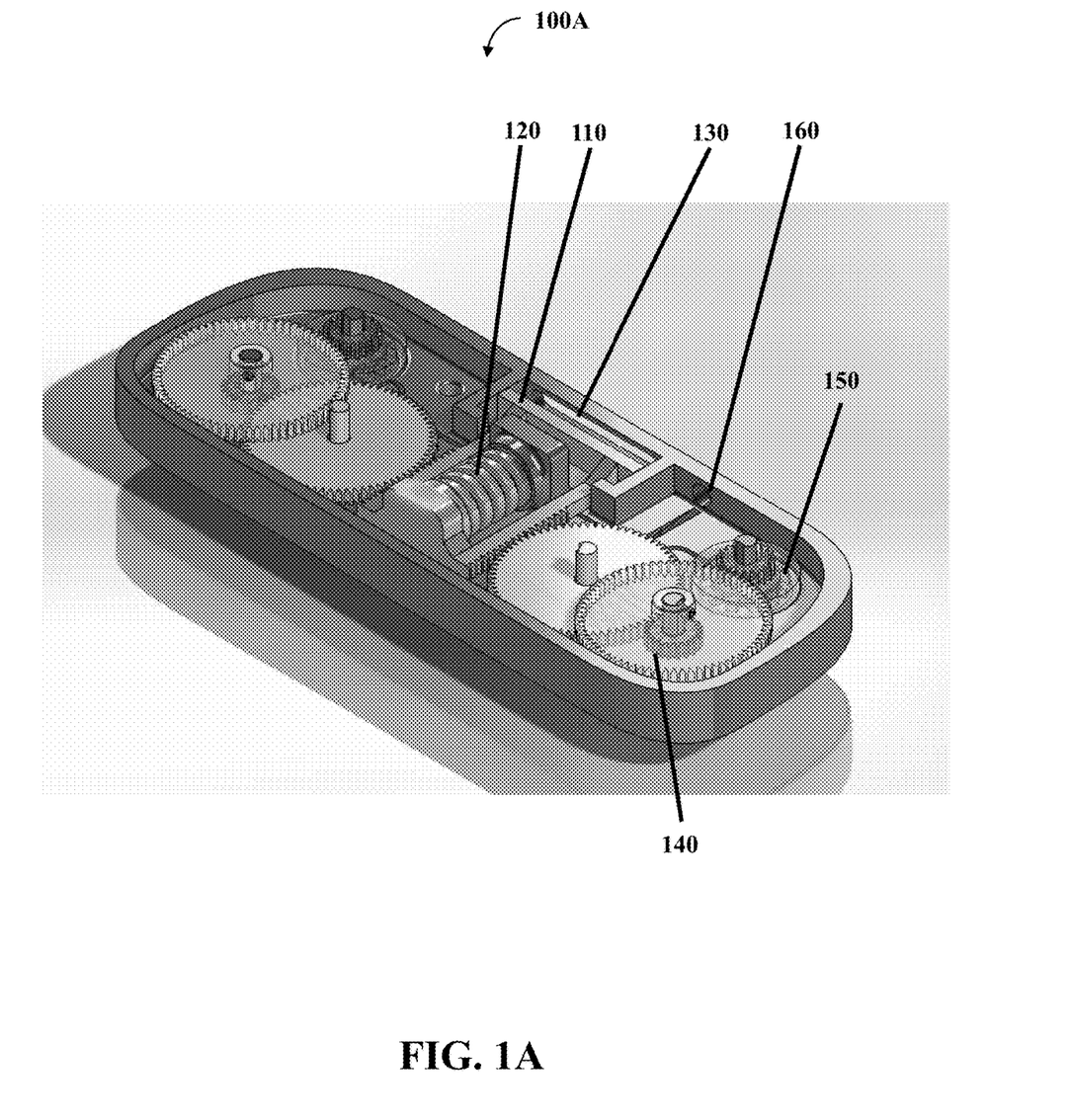
FIGS. 1A-1D illustrate various views of a first embodiment of a housing.

FIGS. 1A-1D (collectively referred to as 'FIG. 1') illustrate various views of an embodiment of a housing 100 (described by the different views 100A-100G). FIG. 1A illustrates a first perspective view 100A of the housing 100. The housing 100 can retain a rack 110 coupled to a spring 120. The rack 110 can also be coupled to a user or an item of a user, such as a backpack (e.g., rucksack strap), purse, briefcase, computer satchel, etc. In one example, the rucksack (e.g., Modular Lightweight Load-carrying Equipment (MOLLE) rucksack) can have a rigid frame that aligns with a wearer's waist. The housing 100 can be coupled (e.g., affixed) to the rigid frame. The rack 110 can be coupled to a strap or other item of the rucksack, such as a strap from a shoulder area of the rucksack. The strap can weave through an end of the rack 110, by way of a slit 130, so that it is taught. As the rucksack is worn, the shoulder area and therefore the strap can experience linear movement (e.g., when decoupled from the hip-belt) due to movement of the rucksack upon the user. As the strap experiences linear movement, the rack 110 and spring 120 can experience the linear movement. In this, the spring 120 can be an example of a linear hardware component configured to experience a linear movement sequence.

In one embodiment, the spring 120 is a compression coil spring and therefore an example of an elastic energy storage hardware component in compression configured to be coupled to a connector (e.g., the strap). The compression spring can be in a neutral compressed position. As the rucksack moves up in response to user movement, the strap (e.g., coupled in tension) can pull the compression spring into decompression. Once the rucksack movement is complete, the compression spring can return to the neutral uncompressed position. This decompression and return to state position can be the linear movement sequence.

The linear movement sequence (e.g., completely linear or substantially linear) of the spring 120 can be converted into a rotational movement sequence by a conversion hardware component. In one example of the conversion hardware component, the rack 110 can rotate a gear set 140. As the spring 120 moves linearly, the rack 110 can move the gear set 140 rotationally (e.g., alternating clockwise and counter-clockwise).

The gear set 140 can be coupled to a rotational magnet assembly 150 that can function as an example energy generation hardware component configured to convert an energy from the rotational movement sequence. In one example, the rotational magnet assembly 150 can comprise twelve cube magnets that rotate around a stationary set of nine coils to convert 3-phase alternating current power. The gear set 140 and rotational magnet assembly 150 can be calibrated with one another. In one example, a gear of the gear set 140 that couples with the rack 110 can be at a ratio of 12.96 in comparison to the rotational magnet assembly 150.

The energy generated from the rotational magnet assembly 150 can, in one embodiment, be transferred to an electronic device. This transfer can be achieved by way of a port 160. The port can be configured to couple the housing 100 with the electronic device (e.g., smartphone, radio, etc.). A plug can be inserted into the port 160 to facilitate the transfer.

In one embodiment, the energy can be transferred to a battery. The port 160 can function as a battery retention hardware component configured to retain the battery. The port 160 can function to charge the battery with the energy. However, other configurations can be used. In one example, the battery can be removable, but physically integrated into the housing 100. In another example, the housing 100 can contain an incorporated battery that is recharged. The port 160 can connect the housing 100 to the electronic device and the incorporated battery can directly power the electronic device and/or be used to power an incorporated battery of the electronic device.

As illustrated, there are a gear set 140 and a rotational magnet assembly 150 on the sides of the rack 110. However, various other embodiments can be practiced other than what is illustrated. In one example, the rack 110 can directly couple to the rotational magnet assembly 150 without the gear set 140. In this example, the rack 110 can itself be the conversion hardware component configured to convert the linear movement sequence into the rotational movement sequence. In one embodiment, as opposed to connecting with a strap, the housing 100 can be self-functioning. The spring 120 can be a tension coil spring where the spring 120 is fixed at one end of the housing 100 and has a mass on the opposite end (e.g., the slit end). As the housing 100 moves (e.g., is jostled while within a woman's purse), the mass can extend the tension coil spring.

Conversely, if the spring 120 is a compression spring, then the mass can compress the compression spring. In one example, the housing 100 can be non-affixed to the purse and the stiffness of the compression coil spring can be relatively small. Therefore, the mass can move relatively freely to create the linear movement as compression and decompression. In one example, the mass and spring 120 can be designed such that the mass compresses the spring 120 in rest, but with relatively little movement, the mass can cause decompression. With other directional movement or a return to rest for the housing 100, the spring 120 can return to the compressed state.

Figure 1B:
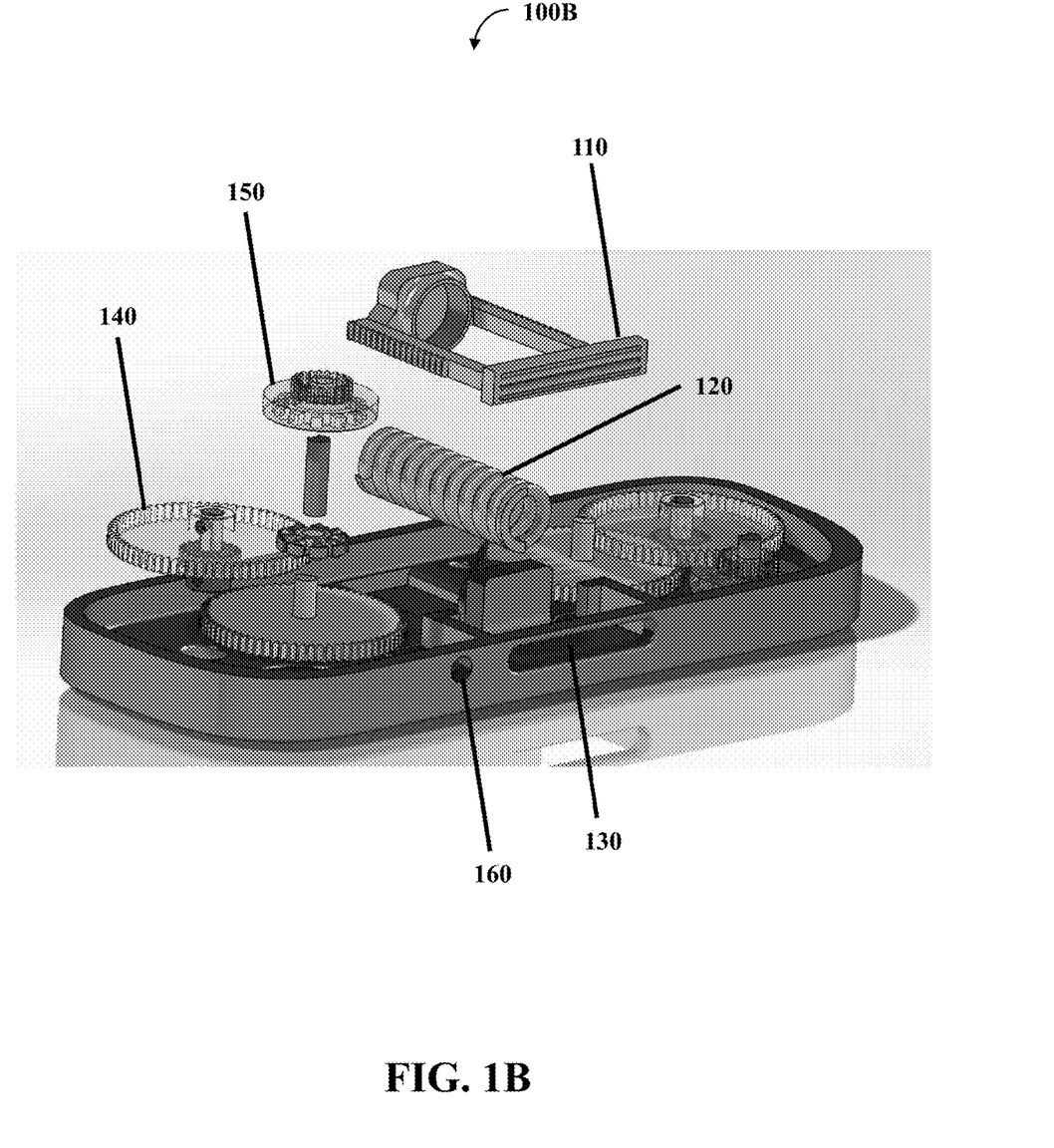

FIG. 1B illustrates an exploded view 100B of the housing 100. The rack 110 and/or the spring 120 can be a capture hardware component configured to experience a movement sequence as a result of the spring 120 being placed in compression (e.g., by way of the strap, in tension, of the rucksack coupling with the rack 110 through the slit 130). The rotational magnet assembly 150 (e.g., along with the gear set 140) can be an energy generation hardware component configured to convert an energy from the movement sequence. The port 160 can be configured to operatively couple the housing 100 to an electronic device that is powered by the rotational magnet assembly and/or the housing 100 can charge the battery as discussed above.

In one embodiment, the housing 100 can function without the slit 130 and instead comprise a mass at the rectangular end of the rack 110. The rack 110 and spring 120 can be a capture hardware component, coupled to the mass, configured to experience a movement sequence due to movement of the mass resultant from movement of the housing 100. The rotational magnet assembly 150 (e.g., directly coupled with the rack 110) can function as an energy generation hardware component configured to convert an energy from the movement sequence. The port 160 can function along with an integrated battery of the housing 100 to power an electronic device with the energy. In one example, the energy generation hardware component can be configured to charge the integrated battery with the energy generated from the movement sequence. The integrated battery can be configured to provide power to the electronic device by way of the port 160.

The housing 100 can be low mass, low profile, and function as an energy harvester (e.g., charge the integrated battery). In one example, the housing 100 can be fastened to a frame of the rucksack (e.g., a waist portion of the frame). A shoulder strap of the rucksack can loop through the housing 100, such as through the slit 130 and looped with an end of the rack 110 (e.g., the strap is looped through the rack 110 and then connected to itself by way of a hook-and-loop configuration).

The system can harness the tension force in the strap by causing the rack 110 to oscillate vertically (e.g., when the system is the housing 100 of FIG. 1 worn on the waist and therefore in line with applied force of the strap). The spring 120 (e.g., functioning as a compression spring) can force the rack 110 back down to the neutral position in response to the strap causing the rack 110 to oscillate. This oscillation can cause the rack 110 to rotate gears in the gear set 140—illustrated as two sets of symmetrical gears—and cause the rotational magnet of the rotational magnet assembly 150 to rotate (e.g., oscillate clockwise and counter-clockwise).

Figure 1C:
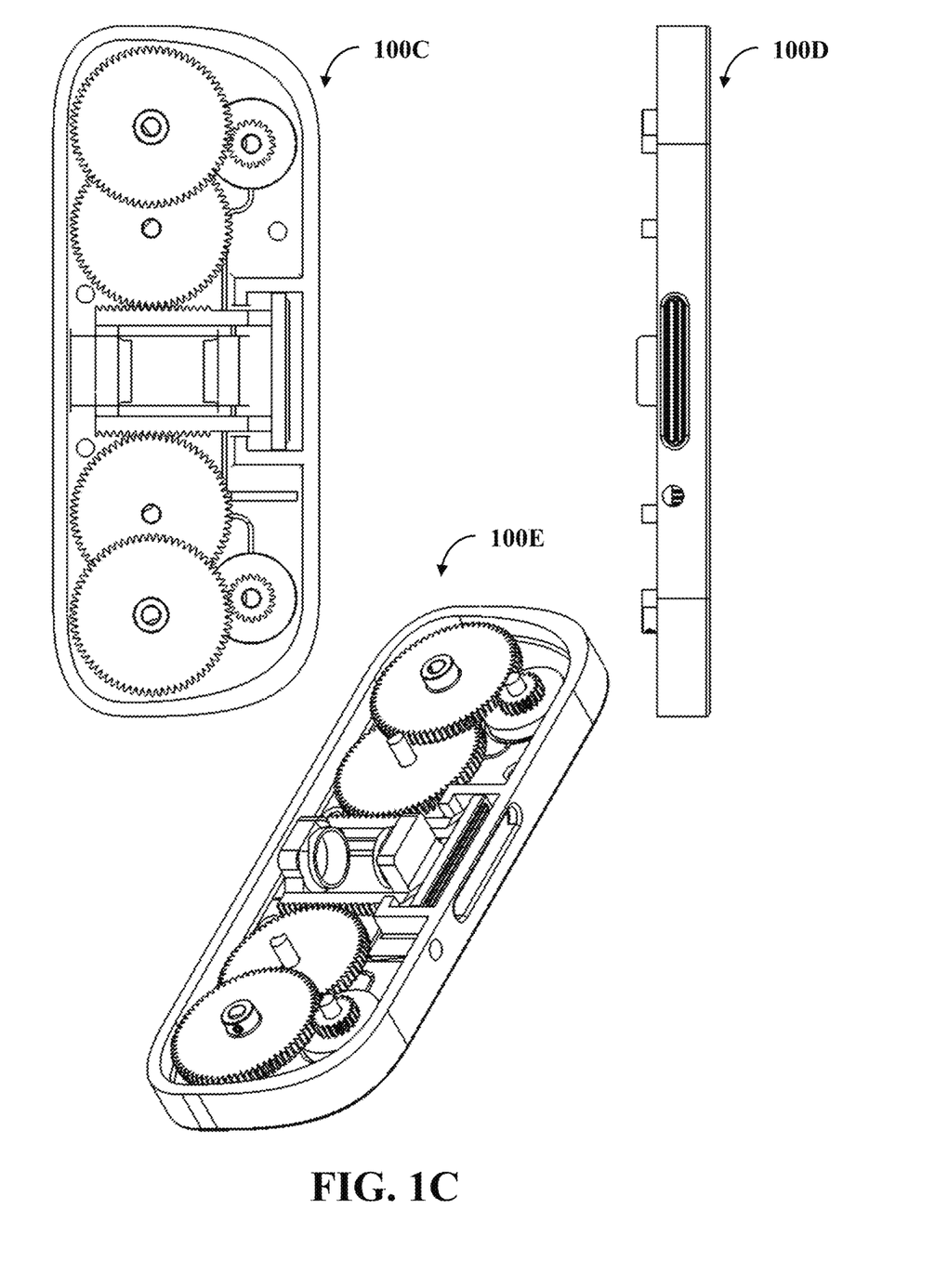

FIG. 1C illustrates three different views 100C-E of the housing 100. The view 100C is a front view of the housing 100 (e.g., with a front cover removed). The view 100D is a top view of the housing 100. While views of the housing 100 are given with perspective, such as the top view 100D being where the strap can integrate, the housing 100 can function without a required orientation. The view 100E is an isometric view of the housing 100.

Figure 1D:
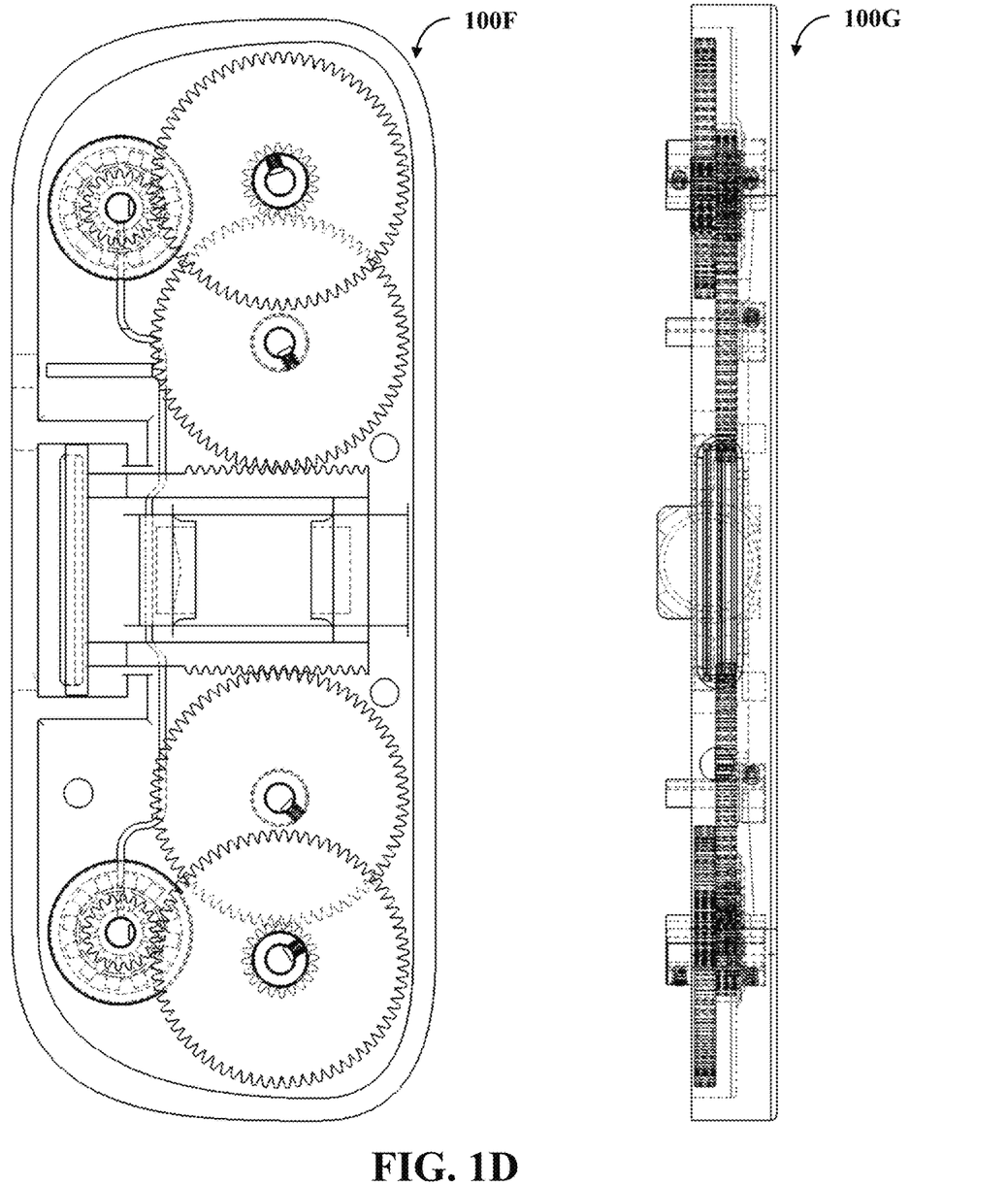

FIG. 1D illustrates two different views 100F-G of the housing 100. The view 100F is of a front semi-transparent view of the housing 100. The view 100G is of a top semi-transparent view of the housing 100.

Figure 2A:
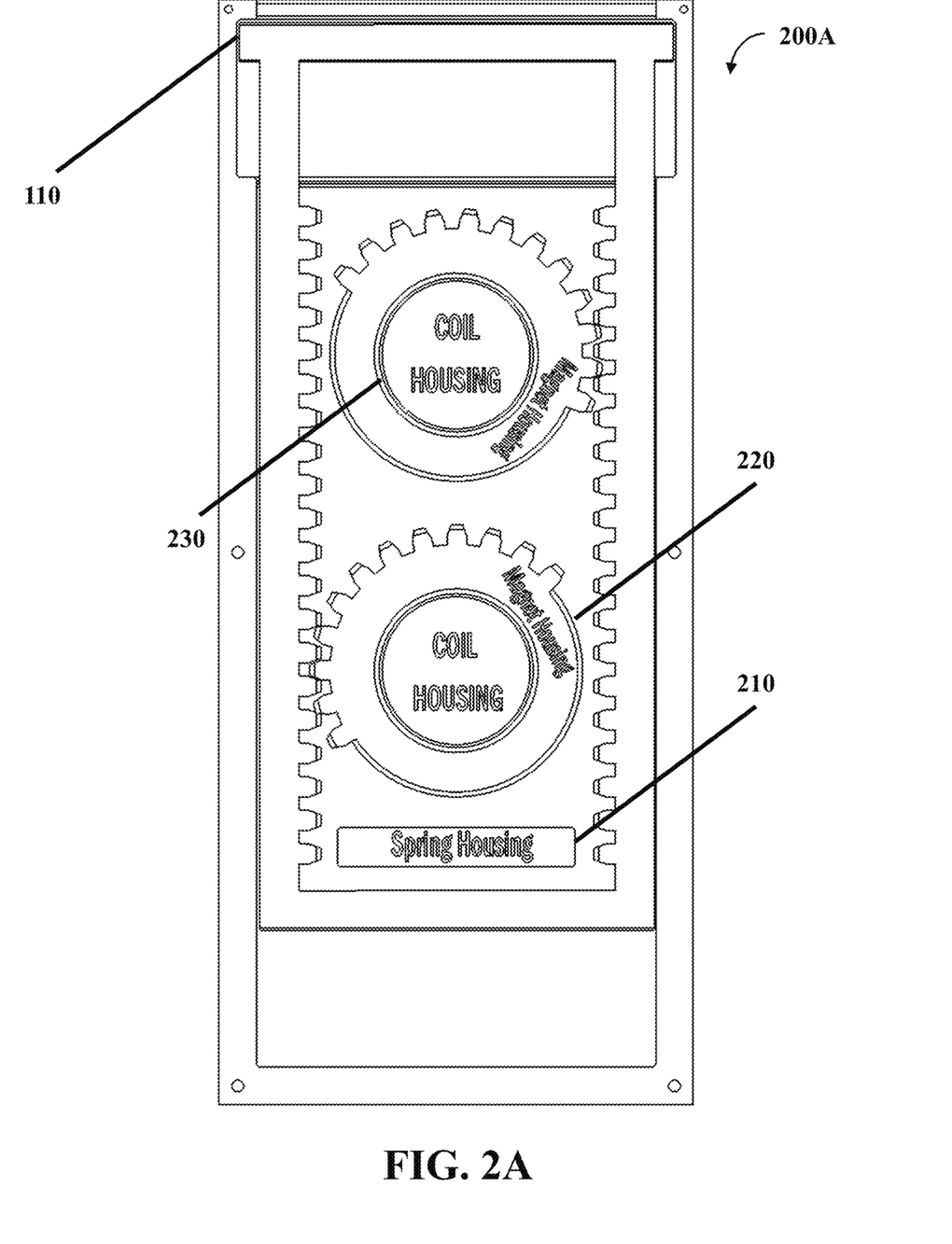
FIGS. 2A-2B illustrate various views of a second embodiment of the housing.
Figure 2B:
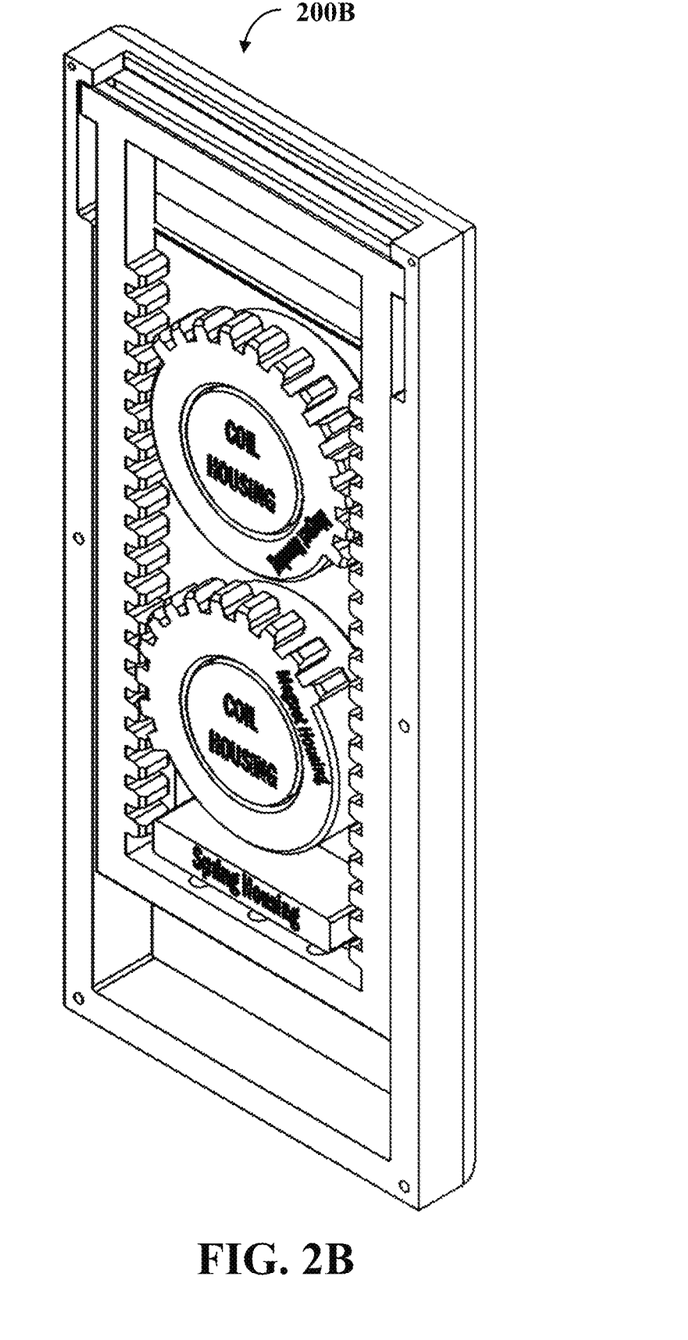

FIGS. 2A-2B (collectively referred to as 'FIG. 2') illustrate various views of an embodiment of a housing 200. The housing 200 can function as a second energy conversion system. The view 200A is a front view of a housing 200 and the view 200B is an isometric view of the housing 200. A spring housing 210 can terminate at one end of the spring 120 of FIG. 1, while the rack 110 terminates at the other end of the spring 120. The rack 110 can move when integrated with the strap and the spring 120 of FIG. 1 can function as described above. As the rack 110 moves, the magnet housing 220 (e.g., that includes the rotational magnet assembly 150 of FIG. 1) can rotate about the coil housing 230 such that the energy is produced.

Figure 3:
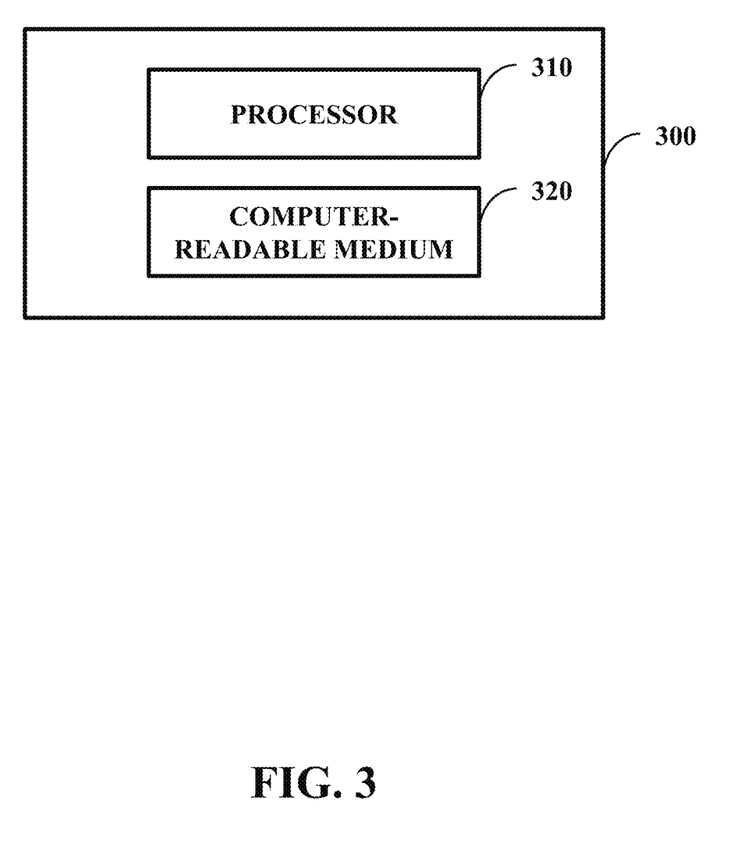
FIG. 3 illustrates one embodiment of a processor and a computer-readable medium.

FIG. 3 illustrates one embodiment of a system 300 comprising a processor 310 (e.g., a general purpose processor or a processor specifically designed for performing a functionality disclosed herein) and a computer-readable medium 320 (e.g., non-transitory computer-readable medium). In one embodiment, the computer-readable medium 320 is communicatively coupled to the processor 310 and stores a command set executable by the processor 310 to facilitate operation of at least one component disclosed herein (e.g., a component that can perform at least part of the method 500 discussed below). In one embodiment, the computer-readable medium 320 is configured to store processor-executable instructions that when executed by the processor 310, cause the processor 310 to perform at least part of a method disclosed herein (e.g., at least part of the method 500 discussed below).

Figure 4:
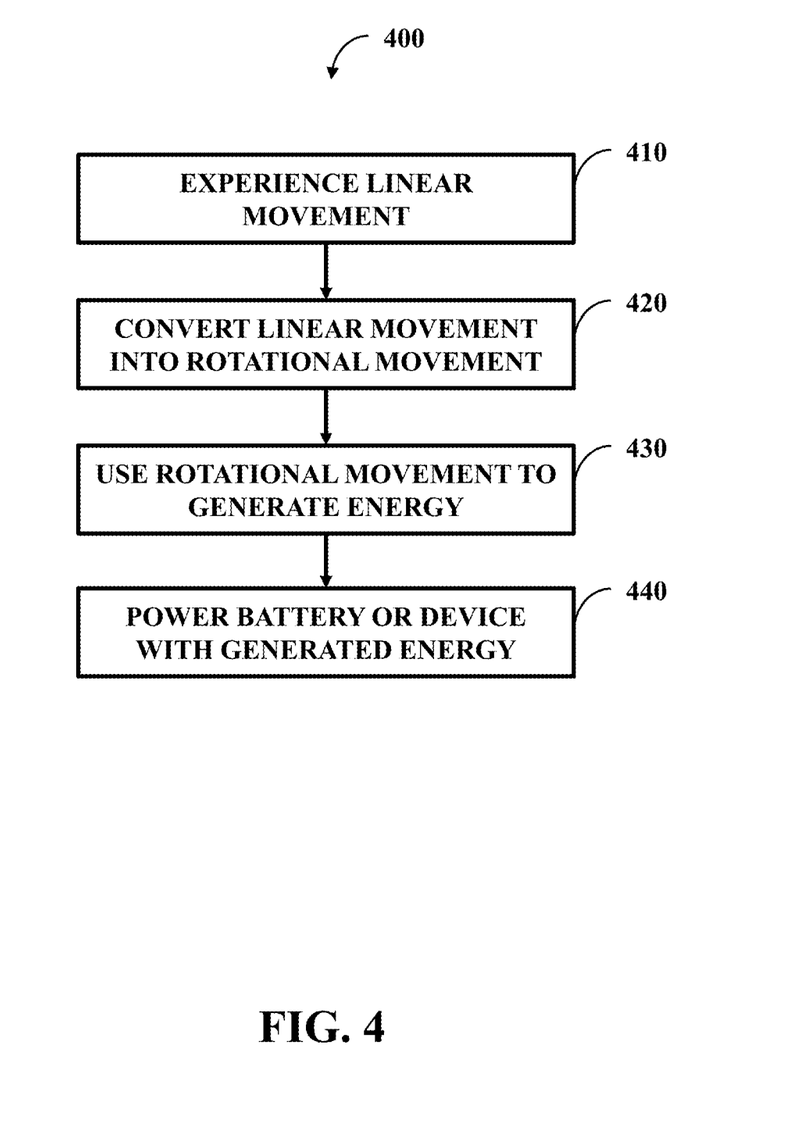
FIG. 4 illustrates one embodiment of a method comprising four actions.

FIG. 4 illustrates one embodiment of a method 400 comprising four actions 410-440. In one example, a housing (e.g., a hardware set comprising one or more pieces of hardware) that experiences the method 400 can be integrated into a piece of hardware, such as being integrated in a running watch and used to power the running watch. The housing (e.g., housing 100 of FIG. 1 or the housing 200 of FIG. 2) can comprise a capture hardware component and/or a linear hardware component. By way of the capture hardware component and/or the linear hardware component, a linear movement can be experienced at 410. At 420, the linear movement can be converted to rotational movement. This conversion can take place by way of a conversion hardware component of the housing. At 430, the rotational movement can be used to generate an energy and can be performed by the energy generation hardware component. This energy can be, at 440, used to power the battery or a device as discussed above.

Figure 5:
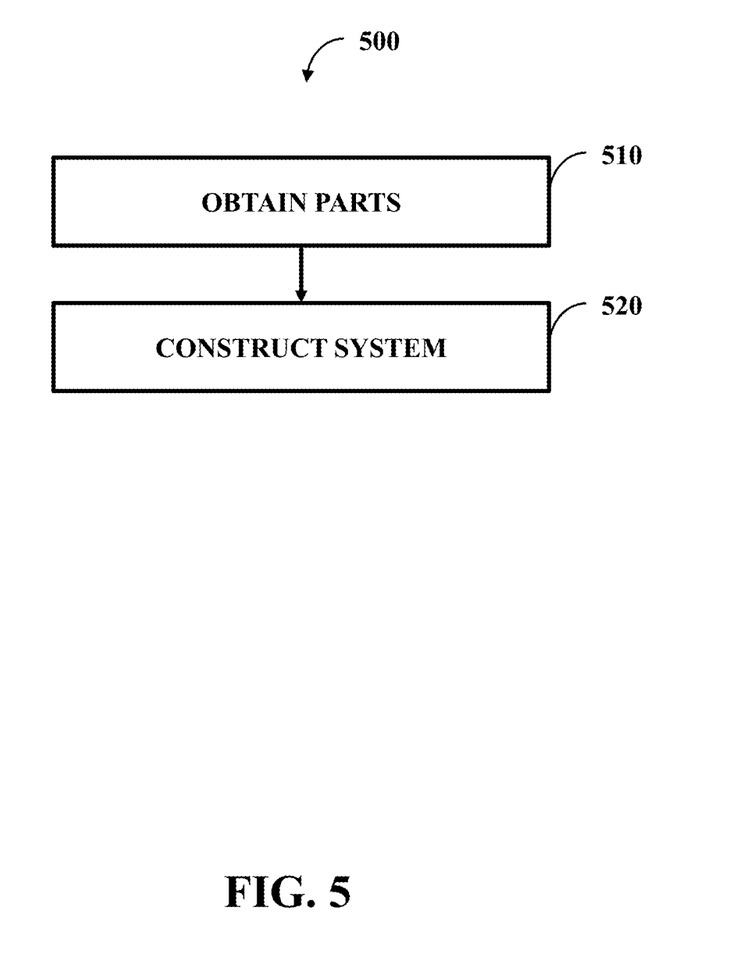
FIG. 5 illustrates one embodiment of a method comprising two actions.

FIG. 5 illustrates one embodiment of a method 500 comprising two actions 510-520. The method 500 can be used to create (e.g., assemble) a system, such as the housing discussed above with regard to the method 400 of FIG. 4. At 510, parts can be obtained. In one example, robotic arms can physically obtain various hardware components. At 520, the system can be constructed. In one example, construction can occur by a robotic assembly mechanism. The robotic arms and/or the robotic assembly mechanism, as well as other hardware that can be used to implement the method 500, can be controlled by an industrial controller that comprises the system 300 of FIG. 3. In one embodiment, the system can be created, at least in part, by hand.

Once created, the system can be used to capture kinetic movement from a wearer and transform this kinetic movement into electrical power. As discussed above, the system can be a housing that retains hardware components and can be integrated with a rucksack, such as a rucksack used by a soldier. The soldier may carry various electronic devices and the system can be used to power those devices (e.g., wirelessly). Since the soldier can power his or her own devices, then the soldier can carry less batteries and therefore lighten his or her load. Outside of a rucksack, in addition to other examples listed above, the system can be included in an armored plate carrier (e.g., vest), civilian backpack, duffle bag, etc.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system comprising:
    a capture hardware component configured to experience a movement sequence as a result of at least part of the housing being placed in tension;
    an energy generation hardware component configured to convert an energy from the movement sequence;
    a housing configured to encapsulate the capture hardware component and the energy generation hardware component; and
    a port configured to operatively couple the housing to an electronic device by way of a plug inserted into the port;
    where the housing is configured to provide access to the port so the port can receive the plug,
    where the energy generation hardware component is configured to charge the electronic device with the energy generated from the movement sequence when the electronic device is coupled to the housing by way of the port.

2. The system of claim 1,
    where the housing is configured to be rigidly affixed to a personal carrying device.

3. The system of claim 1, comprising:
    a battery retention portion configured to retain a battery removable from the housing,
    where the energy generation hardware component is configured to charge the battery, while the battery is retained by the battery retention portion, with the energy generated from the movement sequence.

4. The system of claim 1,
    where the capture hardware component comprises a spring,
    where the movement sequence is a compression sequence, and
    where the compression sequence is compression and decompression of the spring.

5. The system of claim 4, comprising:
a gear set configured to transfer a linear movement of the spring from the compression sequence into a rotational movement;
where the energy generation hardware component comprises a rotational magnet and
where the rotational magnet is configured to rotate in response to the rotational movement of the gear set to generate the energy.

6. The system of claim 1,
where the energy generation hardware component comprises a rotational magnet configured to rotate in response to the movement sequence to transform the energy.

7. The system of claim 6,
where the capture hardware component comprises a spring,
where the movement sequence is a compression sequence, and
where the compression sequence is compression and decompression of the spring.

8. The system of claim 7, comprising:
a battery retention portion configured to retain a battery removable from the housing,
where the energy generation hardware component is configured to charge the battery, while the battery is retained by the battery retention portion, with the energy generated from the movement sequence.

9. The system of claim 8,
where the housing is configured to be rigidly affixed to a personal carrying device.

10. The system of claim 9, comprising:
a gear set configured to transfer a linear movement of the spring from the compression sequence into a rotational movement;
where the energy generation hardware component comprises a rotational magnet and where the rotational magnet is configured to rotate in response to the rotational movement of the gear set to generate the energy.

11. A system retained by a housing, comprising:
a capture hardware component configured to experience a movement sequence as a result of at least part of the housing being placed in tension; and
an energy generation hardware component configured to convert an energy from the movement sequence;
an integrated battery; and
a port configured to operatively couple the housing to an electronic device,
where the energy generation hardware component is configured to charge the integrated battery with the energy generated from the movement sequence and
where the integrated battery is configured to provide power to the electronic device by way of the port such that the energy generation hardware component does not directly charge the electronic device.

12. The system of claim 11,
where the energy generation hardware component comprises a rotational magnet configured to rotate in response to the movement sequence to transform the energy.

13. The system of claim 12,
where the capture hardware component comprises a spring,
where the movement sequence is a compression sequence, and
where the compression sequence is compression and decompression of the spring.

14. The system of claim 13,
where the housing is configured to be rigidly affixed to a personal carrying device.

15. The system of claim 14, comprising:
a gear set configured to transfer a linear movement of the spring from the compression sequence into a rotational movement;
where the energy generation hardware component comprises a rotational magnet and
where the rotational magnet is configured to rotate in response to the rotational movement of the gear set to generate the energy.

16. A system comprising:
a housing;
a mass physically distinct from the housing;
an elastic energy storage hardware component coupled to the housing at one end and to the mass on the opposite end;
an energy transfer hardware component coupled to the elastic energy storage hardware component; and
an energy generation hardware component coupled to the energy transfer hardware component,
where the housing encapsulates the mass, the elastic energy storage hardware component, the energy transfer hardware component, and the energy generation hardware component,
where movement of the mass causes the elastic energy storage hardware component to become compressed and decompressed such that a linear energy is produced,
where the linear energy is transferred from the elastic energy storage hardware component to the energy generation component as rotational energy by way of the energy transfer hardware component, and
where the energy generation hardware component produces an electricity from the transferred rotational energy.

17. The system of claim 16,
where the elastic energy storage hardware component is a compression spring.

18. The system of claim 16, comprising:
a battery configured to be charged by the electricity; and
a port configured to operatively couple the housing to an electronic device by way of a plug inserted into the port,
where the housing is configured to encapsulate the battery,
where the housing is configured to provide access to the port so the port can receive the plug, and
where the battery is configured to charge the electronic device via the port such that the energy generation hardware component does not directly charge the electronic device.

19. The system of claim 16,
where the movement sequence is a linear movement sequence that is converted into a rotational movement sequence and
where the energy is converted from the rotational movement sequence.

20. The system of claim 16,
where the elastic energy storage hardware component is a tension spring.

* * * * *